US011628900B2

(12) United States Patent
Yamamoto et al.

(10) Patent No.: US 11,628,900 B2
(45) Date of Patent: Apr. 18, 2023

(54) STRADDLE VEHICLE

(71) Applicant: KAWASAKI MOTORS, LTD., Akashi (JP)

(72) Inventors: Tomo Yamamoto, Akashi (JP); Takashi Nishiyama, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/451,744

(22) Filed: Oct. 21, 2021

(65) Prior Publication Data

US 2022/0126941 A1 Apr. 28, 2022

(30) Foreign Application Priority Data

Oct. 23, 2020 (JP) .............................. JP2020-178479

(51) Int. Cl.
*B62J 6/01* (2020.01)
*B62J 6/026* (2020.01)
*B62J 17/02* (2006.01)

(52) U.S. Cl.
CPC ................. *B62J 6/01* (2020.02); *B62J 6/026* (2020.02); *B62J 17/02* (2013.01)

(58) Field of Classification Search
CPC ..... B62J 6/01; B62J 6/026; B62J 6/025; B62J 17/02; B62J 17/10; B62Q 1/068; B62Q 1/0094; F21V 23/003; F21V 23/008; F21V 29/70; F21W 2107/17; F21S 45/50; F21S 45/42
See application file for complete search history.

(56) References Cited

U.S. PATENT DOCUMENTS

| | | | | |
|---|---|---|---|---|
| 2007/0086203 A1* | 4/2007 | Nakano | ..................... | B62J 6/023 362/514 |
| 2014/0003078 A1* | 1/2014 | Monma | ..................... | F21S 45/48 362/516 |
| 2014/0226350 A1* | 8/2014 | Mikura | ..................... | B62J 17/02 362/475 |
| 2016/0297492 A1* | 10/2016 | Yamada | ................. | B62K 11/02 |
| 2017/0327027 A1* | 11/2017 | Takaya | ................. | F21S 41/663 |
| 2020/0017164 A1* | 1/2020 | Saeki | ......................... | B62J 6/05 |
| 2021/0061395 A1* | 3/2021 | Koga | ....................... | H01Q 1/52 |

FOREIGN PATENT DOCUMENTS

| | | | | | |
|---|---|---|---|---|---|
| JP | | 2003205878 | * | 7/2003 | ............. B62J 23/00 |
| JP | WO | 2012/120947 | * | 9/2012 | ............. F21S 45/49 |
| JP | | 2019147503 | * | 2/2018 | ............. B62J 23/00 |
| WO | | 2015/071936 A1 | | 5/2015 | |

OTHER PUBLICATIONS

English Machine Translation of JP 2019147503 provided by Espacenet (Year: 2019).*

* cited by examiner

*Primary Examiner* — Zheng Song
(74) *Attorney, Agent, or Firm* — Fay Kaplun & Marcin, LLP (57) ABSTRACT

A straddle vehicle includes a vehicle body, a headlamp main body, and a driver circuit. The driver circuit drives the headlamp main body. The headlamp main body includes a housing that accommodates a light emission member. The driver circuit is disposed outside the housing.

19 Claims, 8 Drawing Sheets

FIG. 8

STRADDLE VEHICLE

CROSS-REFERENCE TO RELATED APPLICATIONS

The present application claims priority to JP Patent Application Serial No. JP 2020-178479 filed Oct. 23, 2021, which is incorporated herein by reference.

TECHNICAL FIELD

The present disclosure relates to a straddle vehicle.

BACKGROUND

Conventionally, a straddle vehicle is known to be equipped with a headlamp that emits light forward. PTL 1 (i.e., PCT International Publication No. WO2015/071936) discloses a straddle vehicle of this type.

Some conventional headlamps provided in a straddle vehicle have a headlamp main body and a driver circuit for driving the headlamp main body. In such a headlamp, the driver circuit is housed inside the headlamp main body, which tends to make the headlamp main body larger. Therefore, the layout around the headlamp main body tends to be restricted.

SUMMARY

The present disclosure relates to a straddle vehicle that can increase the degree of freedom of the layout around the headlamp main body.

According to an aspect of the present disclosure, there is provided a straddle vehicle having the following configuration. That is, the straddle vehicle includes a vehicle body, a headlamp main body, and a driver circuit. The driver circuit drives the headlamp main body. The headlamp main body includes a housing that accommodates a light emission member. The driver circuit is disposed outside the housing.

This allows the headlamp main body to be downsized since the driver circuit is disposed outside the housing. Accordingly, flexibility in the layout around the headlamp main body can be increased compared to the case where the driver circuit is housed inside the headlamp main body.

According to the present disclosure, it is possible to provide a straddle vehicle in which flexibility of layout around the headlamp main body can be increased.

Figure 1:
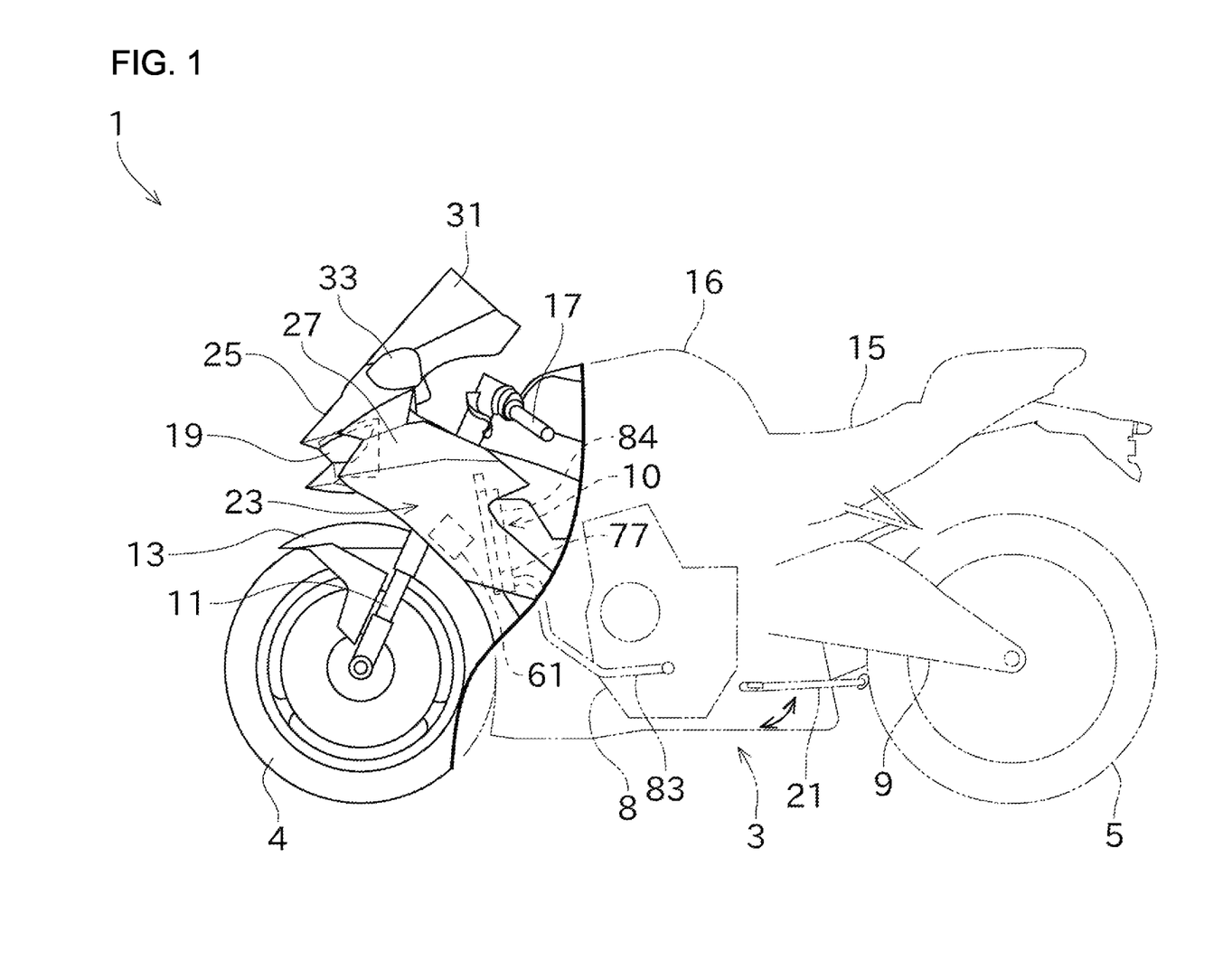
FIG. 1 shows a left side view showing the overall configuration of a straddle vehicle in accordance with an embodiment of the present disclosure.
Figure 2:
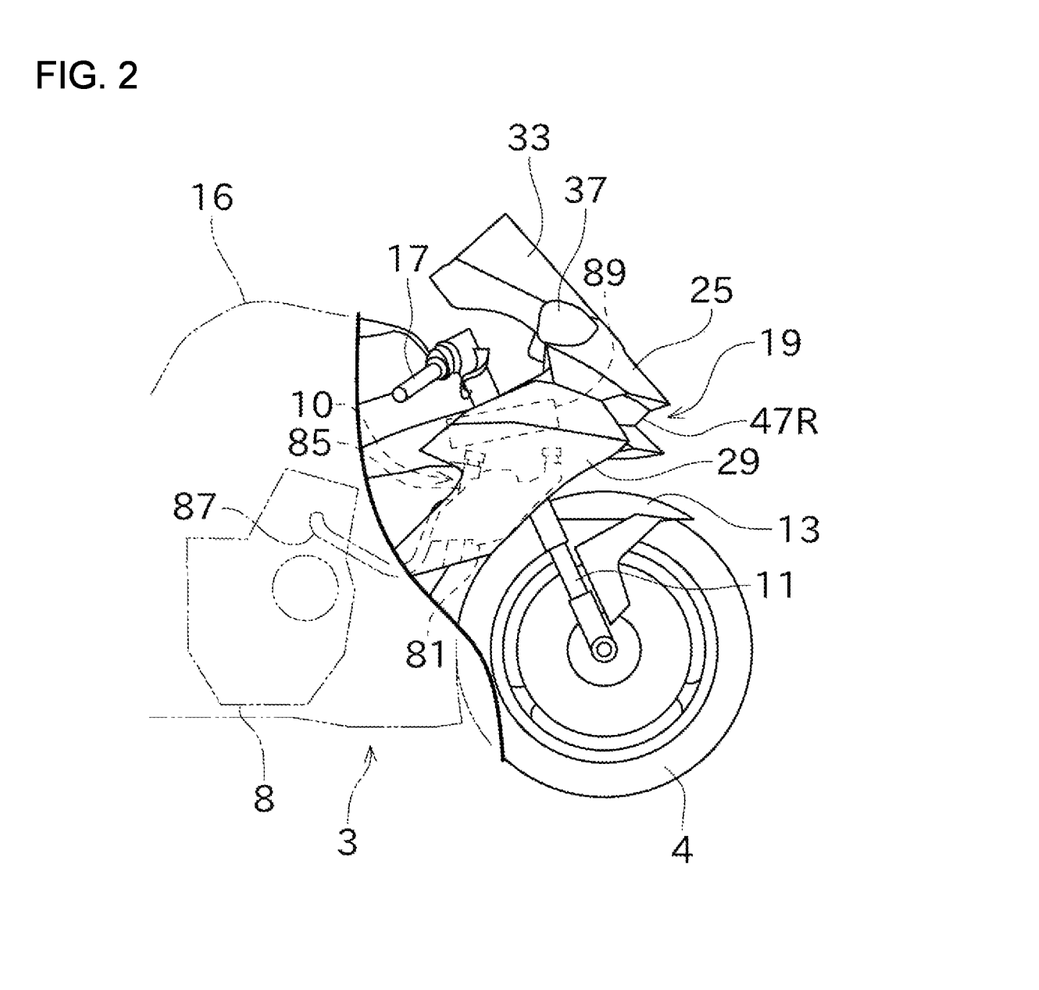
FIG. 2 shows a right side view of a front part of a vehicle body of the straddle vehicle.

DETAILED DESCRIPTION an embodiment of the present disclosure will be described with reference to the drawings. Initially, referring to FIGS. 1 and 2, an overview of a straddle vehicle 1 in accordance with an embodiment of the present disclosure will be described. FIG. 1 is a left side view showing the overall configuration of the straddle vehicle 1. FIG. 2 is a right side view of the front part of a vehicle body 3 of the straddle vehicle 1.

The straddle vehicle 1 of this embodiment is a motorcycle. A driver rides on the straddle vehicle 1 while straddling the vehicle body 3 and drives the straddle vehicle 1. The present disclosure can also be applied to vehicles other than motorcycles. As shown in FIG. 1, the straddle vehicle 1 includes the vehicle body 3, a front wheel 4, and a rear wheel 5.

In the following description, unless otherwise stated, front, rear, left, right, top and bottom mean front, rear, left, right, top and bottom as seen by a driver riding in the straddle vehicle 1. In other words, the left-right direction is the vehicle width direction of the straddle vehicle 1 (vehicle body 3). The left-right direction corresponds to a direction in which an axle of a drive wheel extends. The front-rear direction corresponds to the vehicle length direction of the straddle vehicle 1.

The vehicle body 3 supports an engine 8 which is a drive source for making the straddle vehicle 1 run. The engine 8 functions as a power unit to drive the rear wheel 5 which is the drive wheel. The engine 8 is configured as a gasoline engine, for example.

A configuration other than the engine, for example an electric motor, may be used as the drive source. The driving force generated by the engine 8 is shifted by a transmission device (not shown) and transmitted to the rear wheel 5 provided at the rear of the vehicle body 3. The rear wheel 5 is supported by a swing arm 9 which is pivotable with respect to the frame body of the vehicle body 3.

The front wheel 4 is provided at a front part of the vehicle body 3. The engine 8 is disposed between the front wheel 4 and the rear wheel 5 in the front-rear direction. In detail, the engine 8 is supported by a frame part of the vehicle body 3 which is forward of the swing arm 9. The engine 8 is realized by an internal combustion engine. The internal combustion engine generates power by gas expansion that occurs during fuel combustion.

A radiator 10 is disposed in front of the engine 8 for cooling the engine 8. The radiator 10 includes a radiator core (not shown in drawings), an upstream side tank 84 as shown in FIG. 1, and a downstream side tank 85 as shown in FIG. 2.

The radiator core is disposed in the center of the vehicle width direction. The upstream side tank 84 is disposed adjacent to the radiator core on one side (left side) in the vehicle width direction, and the downstream side tank 85 is disposed adjacent to the radiator core on the other side (right side) in the vehicle width direction.

The cooling water that has cooled the engine 8 and raised its temperature is directed to the radiator core via a pipe 83 and the upstream side tank 84 shown in FIG. 1. In the radiator core, heat exchange for the cooling water is performed. The cooled cooling water is returned to the engine 8 through the downstream side tank 85 and a pipe 87 shown in FIG. 2.

Front forks 11 is mounted to a front part of the vehicle body 3. The front forks 11 are located in front of the radiator 10. The front forks 11 are arranged in pairs on the left and right sides so as to sandwich the front wheel 4 in a front view. The front wheel 4 is rotatably mounted on the lower part of the front forks 11. The front forks 11 are provided with a front fender 13 which serves as a mudguard member covering the front wheel 4 from above.

As shown in FIG. 1, a seat 15 is provided at the upper part of the vehicle body 3 on which the driver sits. A fuel tank 16 for storing fuel to be supplied to the engine 8 is provided in front of the seat 15. A steering handle 17 which can be operated by the driver is provided at the front upper part of the vehicle body 3. The steering handle 17 is disposed in front of the seat 15 and the fuel tank 16. The steering handle 17 is disposed above the front forks 11.

A headlamp 19 disposed in front of the steering handle 17. The headlamp 19 receives a supply of electric power and emits light forward of the straddle vehicle 1. The headlamp 19 is provided at a position higher than the front wheel 4 in the vertical direction (height direction) and at the front part of the vehicle body 3. The headlamp 19 includes left and right headlamp main bodies 47L, 47R as described below.

A side stand 21 is provided below the seat 15 and on one side (left side) of the vehicle body 3 in the vehicle width direction. The side stand 21 is rotatably supported on the left side of the vehicle body 3. When the straddle vehicle 1 is running, the side stand 21 is set in a stowed state with its distal end off the ground as shown in FIG. 1. When the straddle vehicle is parked, the side stand 21 is switched to a supporting state in which it extends downward. By setting the side stand 21 to the supporting state, the straddle vehicle 1 can be supported so that it does not fall over with the vehicle body 3 slightly tilted to the left side, which is the side on which the side stand 21 is positioned.

The straddle vehicle 1 includes a cowl 23. The cowl 23 is a synthetic resin member that constitutes an outer surface of the straddle vehicle 1. In the present embodiment, the cowl 23 is arranged to cover the periphery of the headlamp 19 (left and right headlamp main bodies 47L, 47R), the lower part of the steering handle 17 (side of the vehicle body), and the like. The range in which the cowl 23 is disposed and the shape of the cowl 23 are examples and may differ from the present embodiment.

The cowl 23 has a front cowl 25 and two side cowls 27, 29. The front cowl 25 is disposed mainly at the front part of the vehicle body 3, for example around the headlamp 19. The front cowl 25 is provided so as to surround the top, bottom, left and right sides of the front part of the vehicle body 3. Two side cowls 27 and 29 are respectively disposed at the side parts of the vehicle body 3 and below the steering handle 17. One side cowl 27 is disposed mainly on a left side part of the vehicle body 3, and the other side cowl 29 is disposed mainly on a right side part of the vehicle body 3.

Figure 3:
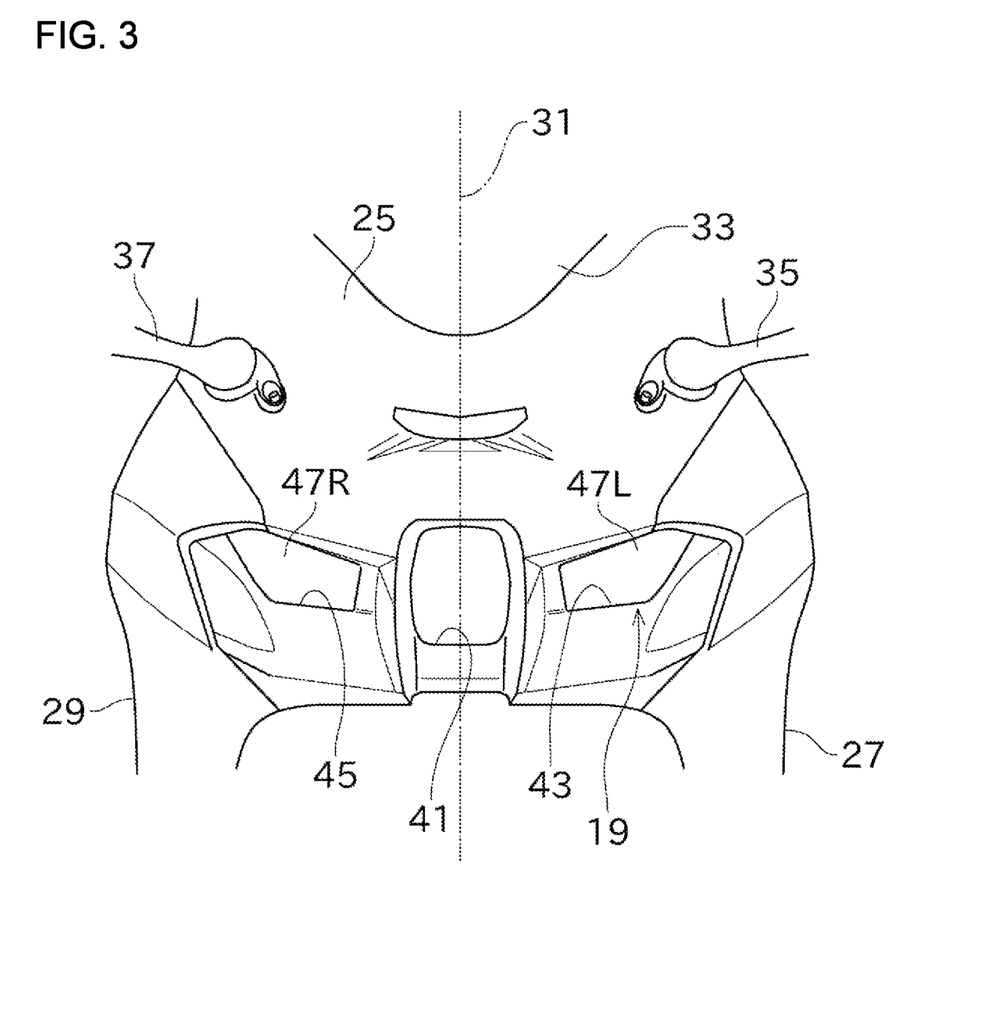
FIG. 3 shows a front view of the front part of the vehicle body of the straddle vehicle.
Figure 4:
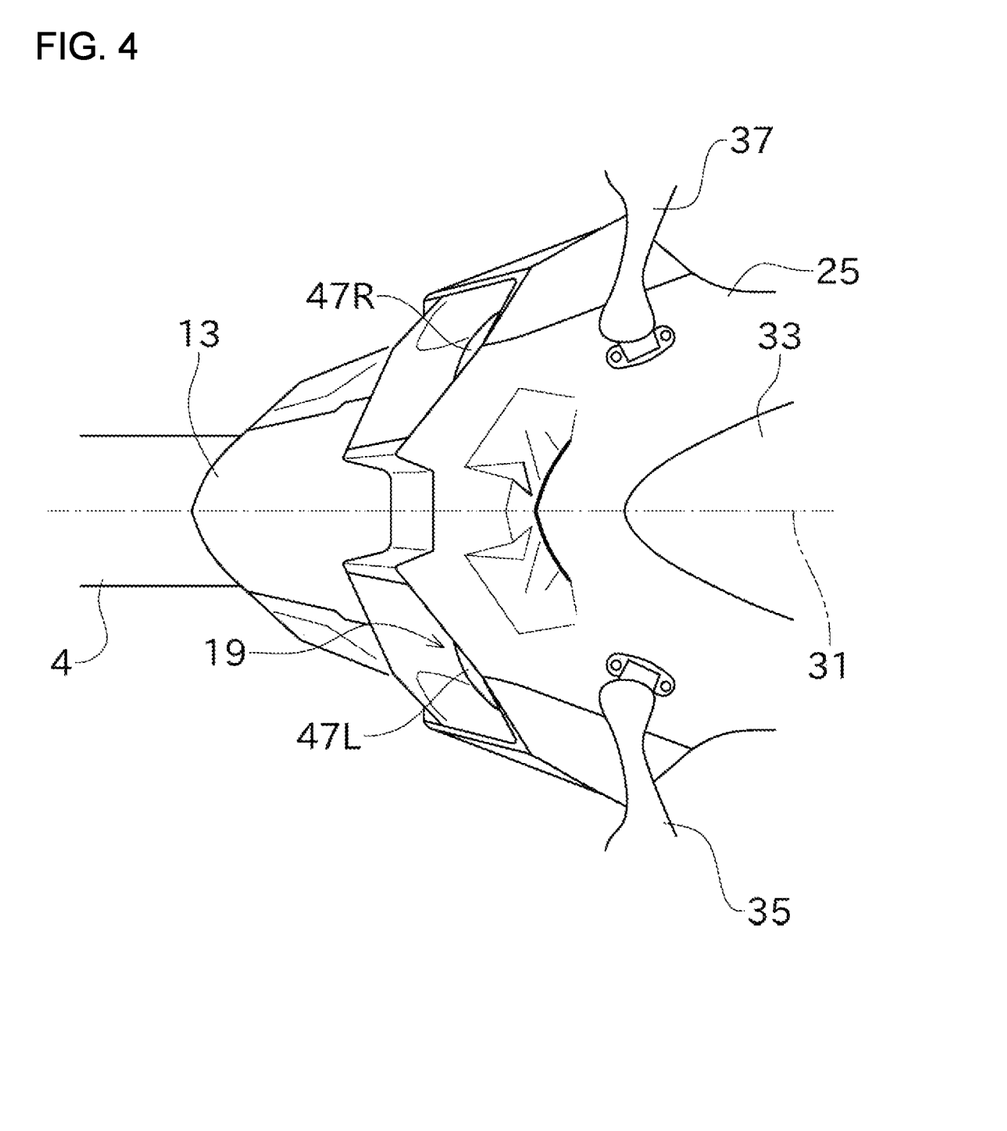
FIG. 4 shows a plan view of the front part of the vehicle body of the straddle vehicle body.
Figure 5:
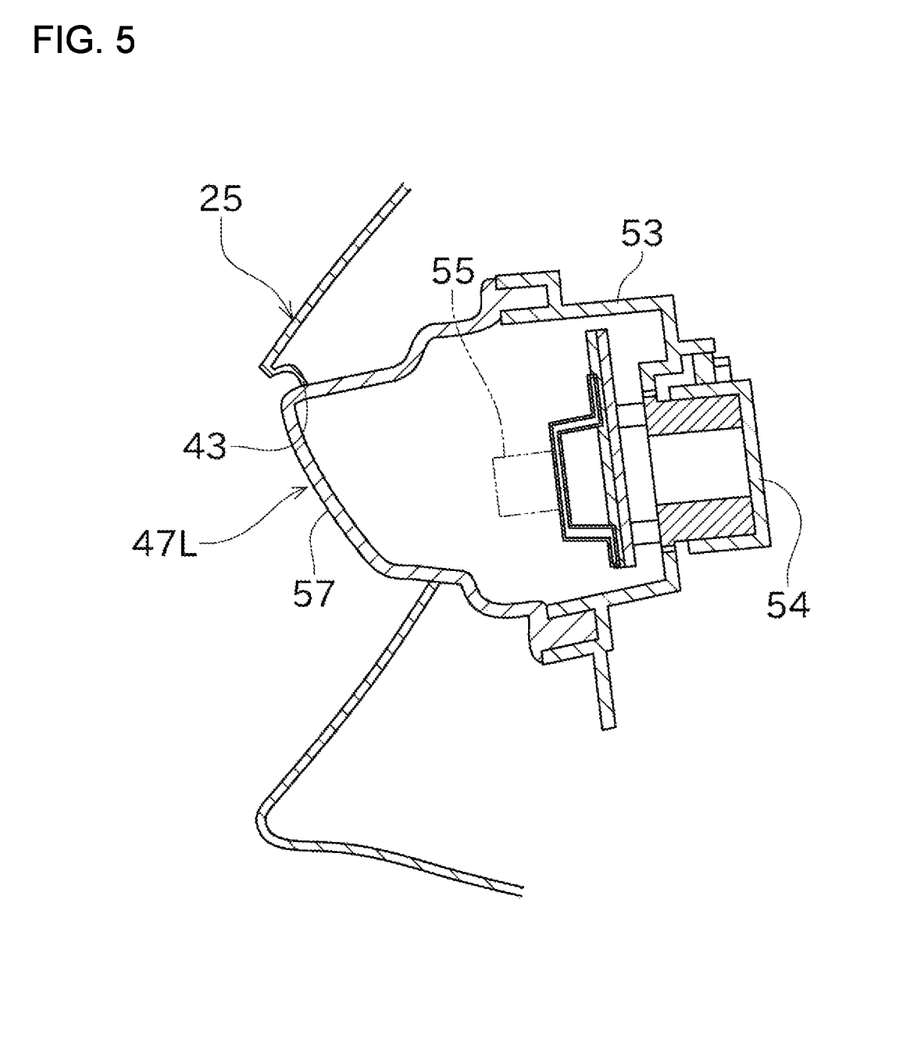
FIG. 5 shows a side cross-sectional view showing a configuration of a left headlamp main body in a headlamp.

Next, referring to FIGS. 3 to 5, the configuration around the headlamps 19 will be described. FIG. 3 is a front view showing the configuration of the front part of the vehicle body 3 of the straddle vehicle 1. FIG. 4 is a plan view showing the configuration of the front part of the vehicle body 3 of the straddle vehicle 1. FIG. 5 is a side cross-sectional view showing a configuration of the left headlamp main body 47L in the headlamp 19.

The front cowl 25 is an exterior member that is exposed to the front side of the vehicle body 3. The front cowl 25 may be formed by a single member or a plurality of members which are connected to form it. The front cowl 25 is continuously provided with the side cowls 27, 29 as exterior members. The side cowls 27, 29, like the front cowl 25, may be formed by a single member or by a plurality of members.

As shown in FIGS. 3 and 4, the front cowl 25 is configured so that the shape of a cross-section cut by a plane perpendicular to the front-rear direction enlarges as it approaches from the front end to the rear. Specifically, a front end part of the front cowl 25 is disposed at and near the center position in the vehicle width direction. The front cowl 25 is formed so that it gradually widens in the vehicle width direction and in the vertical direction as it approaches from the front end to the rear.

The front cowl 25 is configured to be symmetrical with respect to a plane bisecting the vehicle width of the straddle vehicle 1 (the plane shown by a virtual line 31 in FIGS. 3 and 4). At the upper part of the front cowl 25, a windshield 33 is provided which inclines so that it is positioned higher toward rearward. Left and right side mirrors 35, 37 are provided on each of the left and right sides of the front cowl 25, respectively.

In a front view, a plurality of openings are formed at an intermediate part in the vertical direction of the front cowl 25, as shown in FIG. 3. The plurality of openings are lined up in the vehicle width direction. The plurality of openings are an airflow guiding hole 41 and left and right lamp holes 43, 45. The left and right lamp holes 43, 45 are arranged so as to sandwich the airflow guiding hole 41 in the vehicle width direction.

The airflow guiding hole 41 is a hole to let the travel wind in for supplying to the engine 8. In the present embodiment, the airflow guiding hole 41 is disposed in the center of the front cowl 25 in the vehicle width direction. The airflow guiding hole 41 is open toward the front of the vehicle body 3. An airflow guiding duct (not shown in drawings) provided in the vehicle body 3 is connected to the airflow guiding hole 41. This airflow guiding duct forms a path for supplying the travel wind led in through the airflow guiding hole 41 to the engine 8 via an air cleaner or the like. By leading the travel wind into the airflow guiding hole 41, intake air pressure of the engine 8 can be increased.

A left headlamp main body 47L is provided in the left lamp hole 43. The left headlamp main body 47L is disposed on the left side of the airflow guiding hole 41.

A right headlamp main body 47R is provided in the right lamp hole 45. The right headlamp main body 47R is disposed on the right side of the airflow guiding hole 41.

Thus, the left and right headlamp main bodies 47L, 47R are arranged in pairs in the vehicle width direction. The left and right headlamp main bodies 47L, 47R are configured in a substantially symmetrical manner (symmetrical in the vehicle width direction) with respect to the plane indicated by the virtual line 31. The airflow guiding hole 41 is disposed between the left and right headlamp main bodies 47L, 47R in a front view of the straddle vehicle 1. As a result, the left and right headlamp main bodies 47L, 47R and the airflow guiding hole 41 can be arranged in a compact space as a whole.

In the following, with respect to the configuration that is substantially symmetrical, the left side configuration may be indicated with L at the end of the reference numeral, and the right side configuration may be indicated with R at the end of the reference numeral. In the following, only the configuration on the left side is mainly described.

As shown in FIG. 5, the left headlamp main body 47L includes a housing 53, a light emission member 55, and a lens 57, and the like. The housing 53 accommodates the light emission member 55. The light emission member 55 is a light-emitting element, specifically, a light emitting diode (LED). Accordingly, the headlamp main body 47L is an LED type. An irradiation surface through which light from the light emission member 55 is transmitted is formed by the lens 57. However, the light emission member is not limited to a light emitting diode.

Figure 6:
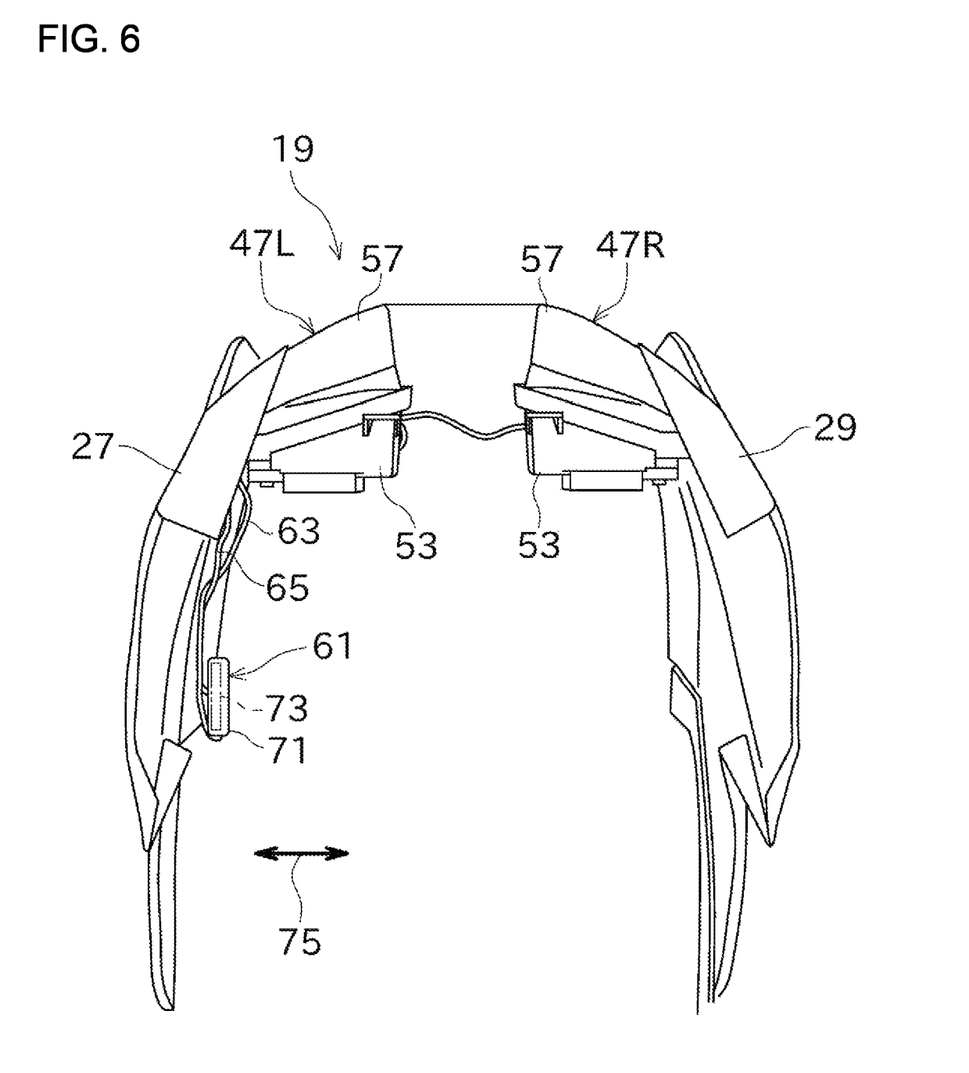
FIG. 6 shows a plan view showing the configuration of the headlamp.
Figure 7:
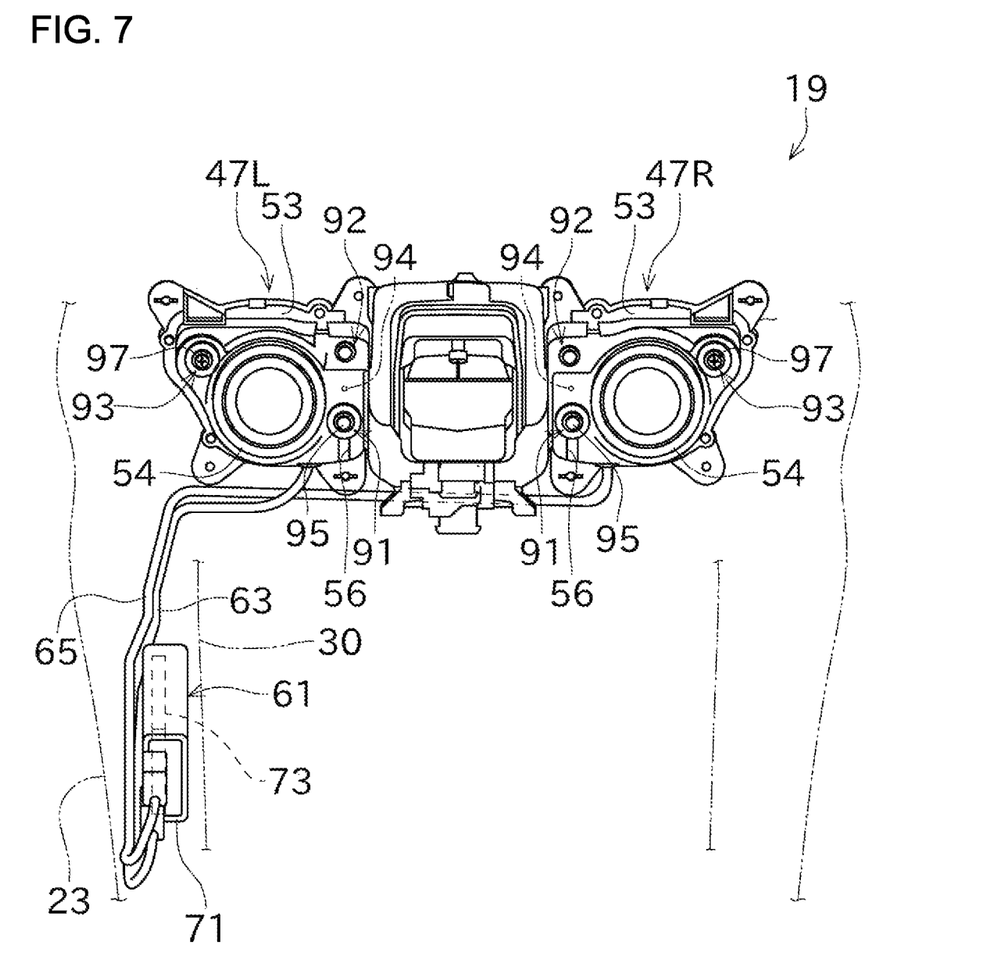
FIG. 7 shows a rear view showing the configuration of the headlamp.
Figure 8:
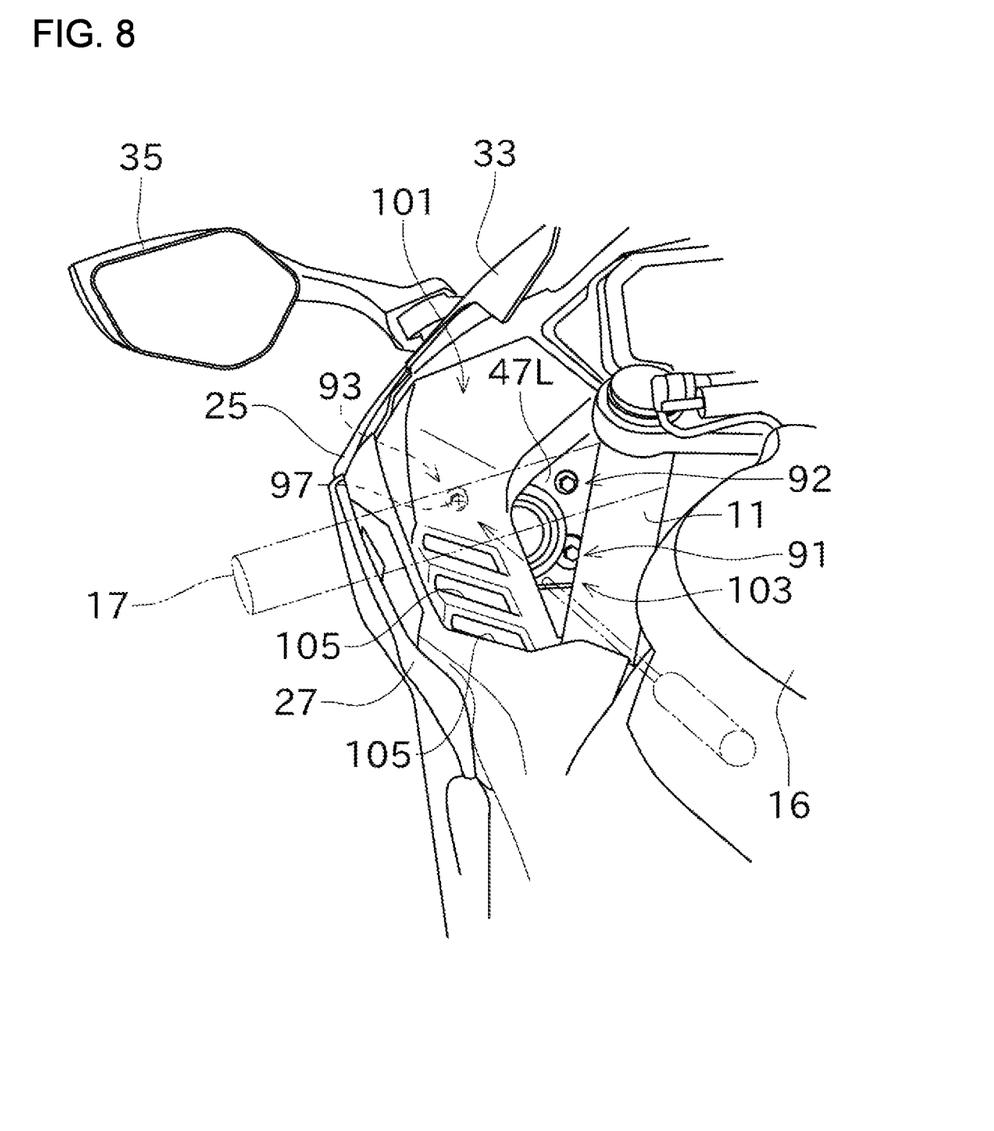
FIG. 8 shows a diagonal view of the front part of the vehicle body of the straddle vehicle viewed from the left rear.

Next, referring to FIGS. 1, 2, and 6 to 8, a configuration related to the headlamps 19 (left and right headlamp main bodies 47L, 47R and a driver circuit 61) will be described. FIG. 6 is a plan view showing the configuration of the headlamp 19. FIG. 7 is a rear view showing the configuration of the headlamp 19. FIG. 8 is a diagonal view of the front part of the vehicle body 3 viewed from the left rear.

As shown in FIGS. 6 and 7, the headlamp 19 includes the left and right headlamp main bodies 47L, 47R and the driver circuit 61. The driver circuit 61 is electrically connected to the left headlamp main body 47R via a first cable 63. The driver circuit 61 is electrically connected to the right headlamp main body 47R via a second cable 65. The driver circuit 61 is configured to be able to drive the left and right headlamp main bodies 47L, 47R. In the present embodiment, the left and right headlamp main bodies 47L, 47R are driven by a common and single driver circuit 61. Therefore, a compact configuration can be realized. The driver circuit 61 can, for example, adjust the electric power to the respective light emission members 55 of the left and right headlamp main bodies 47L, 47R. Specifically, the driver circuit 61 can adjust the voltage conversion of the supplied electric power to a voltage capable of LED operation. Also, the driver circuit 61 can supply a certain current to the light emission members 55 from a battery mounted on the vehicle body 3.

Each of the left and right headlamp main bodies 47L, 47R includes the housing 53. The driver circuit 61 is not housed in any of the left and right housings 53, but is provided at a position separated from any of the housings 53. As a result, the driver circuit 61 is disposed outside the left and right headlamp main bodies 47L, 47R in the headlamp 19. The driver circuit 61 is disposed rearward to the left and right headlamp main bodies 47L, 47R. In this embodiment, the driver circuit 61 is disposed outside the left and right headlamp main bodies 47L, 47R and inside the cowl 23, as shown in FIG. 7. In detail, the driver circuit 61 is disposed in the space between the inner cowl 30 included by the cowl 23 and the left side cowl 27. As shown in FIG. 1, the driver circuit 61 is supported on the left side (on one side) in the vehicle width direction of the vehicle body 3 and is disposed below the steering handle 17.

In this manner, in the headlamp 19, by separating the driver circuit 61 from the left and right headlamp main bodies 47L, 47R and arranging them in different locations, the left and right headlamp main bodies 47L, 47R can be made smaller. Accordingly, the degree of freedom in the layout around the left and right headlamp main bodies 47L, 47R can be increased. Accordingly, for example, it is easy to reduce aerodynamic drag by using a streamlined shape around the headlamp main bodies 47L, 47R in the front cowl 25. Also, for example, it becomes easy to provide slopes around the headlamp main bodies 47L, 47R for obtaining down-force by travel wind.

The driver circuit 61 is provided with a support case 71 and a substrate 73. The support case 71 is supported on the left side of the vehicle body 3. The substrate 73 is accommodated in the support case 71. In the plan view of FIG. 6, the thickness direction of the substrate 73 (the direction indicated by an arrow 75) approximately corresponds to the vehicle width direction. In other words, an angle between the thickness direction of the substrate 73 and the vehicle width direction is smaller than an angle between the thickness direction of the substrate 73 and the front-rear direction of the vehicle body 3.

The length of the support case 71 in the vehicle width direction is smaller than the length in the vehicle length direction. The support case 71 is arranged approximately along the inner surface of the left side cowl 27. Thus, the driver circuit 61 can be compactly arranged, especially in the vehicle width direction.

As shown in FIG. 1, in a side view, the driver circuit 61 is disposed forward of the radiator 10. In detail, the driver circuit 61 is disposed on one side (left side) in the vehicle width direction of the vehicle body 3 and forward of the upstream side tank 84 of the radiator 10. This can avoid the driver circuit 61 from being hit by air that has become hot after passing through the radiator 10 when the straddle vehicle 1 is running. Consequently, it is possible to prevent the driver circuit 61 from being affected by heat.

Moreover, in the present embodiment, the driver circuit 61 is disposed at the front part of the vehicle body 3, specifically in front of the center of gravity of the vehicle body. Therefore, each of the left and right headlamp main bodies 47L, 47R and the driver circuit 61 are disposed not too far apart in the front-rear direction. Therefore, it is easy to shorten each of the first cable 63 and the second cable 65 electrically connecting each of the left and right headlamp main bodies 47L, 47R to the driver circuit 61.

As shown in FIG. 1, the driver circuit 61 is formed in a rectangular shape in a side view. The driver circuit 61 is inclined and arranged in a side view so that one side of this rectangle follows the inclination of the front edge of the side cowl 27. This allows the driver circuit 61 to be arranged while efficiently utilizing the space near the inner surface of the side cowl 27.

As shown in FIG. 1, a blocking member 77 elongated in the vertical direction is disposed at a position rearward of the driver circuit 61. The blocking member 77 is, in the present embodiment, disposed in the vicinity of an end part of the radiator 10 on one side in the vehicle width direction (specifically, in the vicinity of the upstream side tank 84). The blocking member 77 is disposed rearward of the driver circuit 61 in the front-rear direction and at a substantially same position or forward to the radiator 10. In the present embodiment, the blocking member 77 is provided to partition a gap between the upstream side tank 84 of the radiator 10 and the inner surface of the side cowl 27. The blocking member 77 blocks the aforementioned gap over the entire length of the radiator 10 in the vertical direction.

As a result, the blocking member 77 can prevent air that has become hot after passing through the radiator core of the radiator 10 from going around the front of the radiator 10 and contacting the driver circuit 61. Accordingly, it is possible to suppress the influence of heat on the driver circuit 61.

Here, the driver circuit 61 is disposed on one side (left side) in the vehicle width direction of the vehicle body 3 near the part of the radiator 10 outside the vehicle width direction. When the vehicle body 3 is running in a neutral position in which it does not lean, the height of the driver circuit 61 is approximately the same as the height of the radiator 10. When the straddle vehicle 1 is parked using the side stand 21, the driver circuit 61 is slightly lower than the height of the radiator 10 as the vehicle body 3 leans to the left. In the parked state, the hot air of the radiator 10 rises, but the hot air is unlikely to contact the driver circuit 61 which is lower than the radiator 10. Therefore, when the vehicle is stopped, the influence of the hot air of the radiator 10 is less likely to affect the driver circuit 61, so that the temperature rise of the driver circuit 61 can be suppressed.

As shown in FIG. 2, a reservoir tank 81 of the radiator 10 is provided on the other side (right side) in the vehicle width direction of the vehicle body 3. The reservoir tank 81 is connected to a path of the cooling water circulating between the radiator 10 and the engine 8. An appropriate amount of cooling water is stored inside the reservoir tank 81. Even when the temperature of the cooling water changes due to the cooling of the engine 8, the change in the volume of the cooling water can be absorbed by the change in the amount of cooling water in the reservoir tank 81. The reservoir tank 81 of the radiator 10 is disposed on the same side as the downstream side tank 85 in the vehicle width direction.

The driver circuit 61 is disposed on the left side in the vehicle body 3. The reservoir tank 81 is disposed on the right side in the vehicle body 3. Accordingly, the side on which the driver circuit 61 is disposed is opposite to the side on which the reservoir tank 81 is disposed in the vehicle width direction. The reservoir tank 81 is disposed in the vicinity of the right side part in the vehicle width direction of the radiator 10 (in the vicinity of the downstream side tank 85). This allows the reservoir tank 81 and the driver circuit 61 to be arranged in a compact space as a whole.

As shown in FIG. 2, a canister 89 is provided on the right side of the vehicle body 3. The canister 89 is a fuel evaporation gas emission deterrent device that adsorbs fuel gas evaporated in the fuel tank 16.

The canister 89 is disposed on the right side in the vehicle body 3. Accordingly, the side on which the driver circuit 61 is disposed is opposite to the side on which the canister 89 is disposed in the vehicle width direction. The canister 89 is disposed on the right side of the front part of the vehicle body 3, above the reservoir tank 81 and below the steering handle 17. This allows the canister 89 and the driver circuit 61 to be arranged in a compact space as a whole.

The downstream side tank 85 of the radiator 10 is disposed on the right side in the vehicle body 3. Accordingly, the side on which the driver circuit 61 is disposed is opposite to the side on which the downstream side tank 85 is disposed in the vehicle width direction. The downstream side tank 85 of the radiator 10 is disposed on the right side of the front part of the vehicle body 3. The downstream side tank 85 is disposed in the vicinity of the reservoir tank 81, connected to the engine 8 via the pipe 87.

Next, referring to FIG. 7, a configuration for adjusting the optical axis of the light emission member 55 will be described. FIG. 7 is a view of the headlamp 19 from the rear side. The headlamp main body 47L shown in FIG. 7 is fixed to a frame or the like of the vehicle body 3. The left headlamp main body 47L includes an angle adjustment base 54. The angle adjustment base 54 is attached to the housing 53 at three points: a first point 91, a second point 92, and a third point 93. An optical axis adjustment mechanism is disposed between the housing 53 and the angle adjustment base 54. As shown in FIG. 5, the light emission member 55 is housed in the housing 53 while attached to the angle adjustment base 54.

As shown in FIG. 7, the first point 91 is located at a lower part of the housing 53 and near the center in the vehicle width direction. The second point 92 is located at an upper part of the housing 53 and on a side closer to the center in the vehicle width direction. The third point 93 is located at an upper part of the housing 53 and on an outer side in the vehicle width direction.

Of the first point 91, the second point 92, and the third point 93, at the second point 92, the position of the angle adjustment base 54 relative to the housing 53 cannot be changed in the front-rear direction. On the other hand, at the first point 91 and the third point 93, the mounting position of the angle adjustment base 54 relative to the housing 53 can be changed in the front-rear direction by screw mechanisms 95 and 97, respectively. As a result, the orientation of the plane containing the triangle comprising the first point 91, the second point 92, and the third point 93 can be changed in three dimensions. At this time, the second point 92 functions substantially like a spherical bearing. By changing this orientation, the mounting orientation of the angle adjustment base 54, or in other words, the orientation of the optical axis of the light emission member 55 in the left headlamp main body 47L, can be adjusted in three dimensions.

As shown in FIG. 7, the screw mechanism 95, 97 is provided at a position corresponding to each of the first point 91 and the third point 93. The screw mechanisms 95, 97 comprise the optical axis adjustment mechanism described above. Each of the screw mechanisms 95, 97 is constituted by adjustment bolts with a screw axis arranged approximately along a front-rear direction.

With respect to the screw mechanism 95 of the first point 91, a flange is formed on the head of the adjustment bolt, and teeth shaped like a face gear are formed on this flange. However, these teeth are not shown in the drawings. An insertion groove 56 is formed in the angle adjustment base 54. The insertion groove is elongated extending downward in the vertical direction from the mounting hole for the adjustment bolt at the first point 91. By inserting an appropriate tool into this insertion groove 56 from below, a tip of the tool is engaged with the teeth of the adjustment bolt, and by rotating the tool in this state, the adjustment bolt of the screw mechanism 95 can be rotated. Since the first point 91 is close to the center in the vehicle width direction, the front forks 11 or the like is located behind it, and it is difficult to secure a space for inserting the tool from the rear. In this regard, by using the above configuration, the screw mechanism 95 of the first point 91 can be accessed by inserting a tool from below the front part of the front cowl 25.

With respect to the screw mechanism 97 of the third point 93, a Phillips groove is formed, for example, in the head formed in the rear end of the adjustment bolt. The adjustment bolt of the screw mechanism 97 can be rotated by inserting a tip blade of the tool into this Phillips groove from the rear side and rotating it.

As shown in FIG. 8, a cover 101 covering the left headlamp main body 47L from rearward and upward is provided so that the cover connects to the front cowl 25. An opening 103 is formed on a side closer to the center in the vehicle width direction than the cover 101. As shown in the chain line in FIG. 8, the tool can be inserted through this opening 103 to rotate the adjustment bolt of the screw mechanism 97 at the third point 93.

The cover 101 has a plurality of slits 105 formed through it. Each of the slits 105 allows light to pass through in a substantially vertical direction. The slits 105 can ensure the brightness of the space below the cover 101. If there were no slits 105, the space around the headlamp main body 47L would be dark, and thus the visibility of the tip of the tool inserted into the opening 103 from behind and the third point 93 would be poor. Therefore, it is difficult to engage the tip of the tool with the Phillips groove of the adjustment bolt of the screw mechanism 97. In the present embodiment, the vicinity of the third point 93 can be brightened by light shining through the slits 105. Therefore, the optical axis adjustment work of the headlamp main body 47L can be easily and surely performed.

As shown in FIG. 7, the first point 91 and the second point 92 are both located on the side near the center of the vehicle width direction and have different heights from each other. The third point 93 is located on a side farther from the center of the vehicle width direction of the vehicle body 3 than any of the first point 91 and the second point 92. The height of the third point 93 is higher than the height of the intermediate position 94 between the first point 91 and the second point 92. The third point 93 is approximately the same height as the second point 92.

As a result, the three points for adjusting the optical axis form a triangle so that it is positioned higher as it approaches from the center of the vehicle width direction to the outer side and it is thinner as it approaches from the center of the vehicle width direction to the outer side. Accordingly, the layout of the three points is highly adaptable to the headlamp main bodies 47L, 47R of a slanted eyes shape as shown in FIG. 3, and miniaturization, etc. can be easily achieved. In addition, since the adjustment bolts for adjusting the optical axis, etc. are not arranged below the headlamp main bodies 47L, 47R or outside the vehicle width direction, a large degree of freedom in the layout of that part can be secured.

As described above, the straddle vehicle 1 of the present embodiment includes the vehicle body 3, the left and right headlamp main bodies 47L, 47R, and the driver circuit 61. The driver circuit 61 drives the left and right headlamp main bodies 47L, 47R. Each of the left and right headlamp main bodies 47L, 47R includes the housing 53 that accommodates a corresponding light emission member 55. The driver circuit 61 is disposed outside the housing 53.

The driver circuit 61 is disposed outside of the housing 53 of the left headlamp main bodies 47L and is disposed outside of the housing 53 of the left headlamp main bodies 47R. Therefore, the respective left and right headlamp main bodies 47L, 47R can be made smaller. Accordingly, the flexibility of the layout around the left and right headlamp main bodies 47L, 47R can be increased. In addition, the flexibility of the design of the left and right headlamp main bodies 47L, 47R can be improved, and for example, a design that can reduce aerodynamic drag can be realized.

In the straddle vehicle 1 of the present embodiment, the driver circuit 61 has the substrate 73. The angle between the thickness direction of the substrate 73 (the direction indicated by the arrow 75 in FIG. 5) and the vehicle width direction is smaller than the angle between the thickness direction of the substrate 73 and the front-rear direction of the vehicle body 3.

This makes it possible to compactly arrange the driver circuit 61, particularly in the vehicle width direction. In addition, the increase in aerodynamic drag when the straddle vehicle 1 is running can be suppressed.

The straddle vehicle 1 of the present embodiment includes the radiator 10 for cooling the engine 8. The driver circuit 61 is disposed in front of the radiator 10.

This avoids high temperature air which has passed through the radiator 10 from contacting the driver circuit 61 when the straddle vehicle 1 is traveling. Accordingly, it is possible to prevent the driver circuit 61 from being affected by heat.

In the straddle vehicle 1 of the present embodiment, the blocking member 77 is disposed rearward of the driver circuit 61.

As a result, the blocking member 77 can prevent air that has become hot after passing through the radiator 10 from back-flowing forward. Accordingly, it can be reliably prevented that the driver circuit 61 is affected by the heat.

The straddle vehicle 1 of the present embodiment includes the side stand 21. When the side stand 21 is in use, the side stand 21 supports the vehicle body 3 in the inclined state in which the vehicle body 3 is inclined to the left. Relative to the radiator 10, the driver circuit 61 is located on the side on which the vehicle body 3 is inclined in the vehicle width direction when the side stand 21 is in use (i.e., the left side).

This makes it possible to position the driver circuit 61 below the radiator 10 when the side stand 21 is used (when the straddle vehicle 1 is parked). Therefore, by positioning the driver circuit 61 below the radiator 10, the temperature rise of the driver circuit 61 due to the heat of the radiator 10 can be suppressed.

The straddle vehicle 1 of the present embodiment includes the reservoir tank 81 of the radiator 10 on the right side in the vehicle width direction. The driver circuit 61 is located on the left side which is opposite to the side on which the reservoir tank 81 is located in the vehicle width direction.

This allows the reservoir tank 81 and the driver circuit 61 to be disposed in an overall compact space.

The straddle vehicle 1 of the present embodiment includes the canister 89 located on the right side in the vehicle width direction. The driver circuit 61 is located on the left side which is opposite to the side on which the canister 89 is located in the vehicle width direction.

This allows the canister 89 and the driver circuit 61 to be disposed in an overall compact space.

In the straddle vehicle 1 of the present embodiment, the headlamp main bodies 47L, 47R are arranged in pairs on the left and right (in the vehicle width direction). Each headlamp main body 47L (47R) is configured so that the optical axis is adjustable by changing positions of the first point 91 and the second point 93, among the first point 91, the second point 92, and the third point 93. The first point 91 and the second point 92 are located at different heights from each other. The third point 93 is located farther from the center of the vehicle width direction of the vehicle body 3 than any of the first point 91 and the second point 92. The height of the third point 93 is higher than the height of the intermediate position 94 between the first point 91 and the second point 92.

This allows, in particular, to increase the flexibility in the layout of the space around the lower part of the left and right headlamp main bodies 47L, 47R.

In the straddle vehicle 1 of the present embodiment, the headlamp main bodies 47L, 47R are arranged in pairs on the left and right (in the vehicle width direction). The airflow guiding hole 41 is arranged between the left and right headlamp main bodies 47L, 47R.

As a result, the left and right headlamp main bodies 47L, 47R and the airflow guiding hole 41 can be arranged in a compact space as a whole.

While some preferred embodiments of the present disclosure have been described above, the foregoing configurations may be modified, for example, as follows.

In the above embodiment, the headlamp is provided with an LED-type headlamp main body, but it may be provided with another type of headlamp main body. For example, a halogen lamp can be applied.

The driver circuits 61 may be arranged in pairs on the left and right sides, corresponding to the left and right headlamp main bodies 47L, 47R.

The angle that the substrate 73 of the driver circuit 61 makes with the front-rear direction of the vehicle body can be set arbitrarily. The angle that the thickness direction of the substrate 73 makes with the vehicle width direction can also be set arbitrarily.

The blocking member 77 is not particularly limited in its installation position and shape. Any position and shape of the blocking member 77 can be adopted as long as it can prevent air that has passed through the radiator 10 and become hot from flowing-back forward.

The reservoir tank 81 and the canister 89 of the radiator 10 may be positioned on the left side, and the driver circuit 61 may be positioned on the right side.

The arrangement of the first point 91, the second point 92, and the third point 93 can be changed appropriately. Among the three points, any of the points at which the mounting position of the angle adjustment base 54 relative to the housing 53 can be changed can be selected appropriately. For example, the position of the angle adjustment base 54 can be configured to be changeable at the second point 92.

In view of the foregoing teachings, it is apparent that the present disclosure can take many modified and variant forms. Accordingly, it is to be understood that the disclosure may be practiced in a manner other than that described herein within the scope of the appended claims.

DESCRIPTION OF THE REFERENCE NUMERALS

1 straddle vehicle
3 vehicle body
8 engine (drive source)
10 radiator
21 side stand
41 airflow guiding hole
47L left headlamp main body
47R right headlamp main body
53 housing
55 light emission member
61 driver circuit
73 substrate
77 blocking member
81 reservoir tank
89 canister
91 first point
92 second point
93 third point

The invention claimed is:

1. A straddle vehicle, comprising:
a vehicle body;
a headlamp main body including a housing that accommodates a light emission member;
a driver circuit driving the headlamp main body; and
a cowl including:
a front cowl disposed at a front part of the vehicle;
a first side cowl disposed at a first side of the vehicle; and
a second side cowl disposed at a second side of the vehicle,
wherein the driver circuit is arranged near an inner surface of the first side cowl,
wherein the driver circuit is disposed outside the housing in a vehicle width direction, and
wherein the driver circuit is spaced from the housing.

2. The straddle vehicle according to claim 1, wherein the driver circuit has a substrate and wherein an angle between a thickness direction of the substrate and the vehicle width direction is smaller than an angle between the thickness direction of the substrate and a front-rear direction of the vehicle body.

3. The straddle vehicle according to claim 2, wherein a blocking member is disposed rearward of the driver circuit.

4. The straddle vehicle according to claim 2, further comprising:
a radiator; and
a side stand supporting the vehicle body in an inclined state in which the vehicle body is inclined to one side in the vehicle width direction when in use,
wherein relative to the radiator, the driver circuit is located on the side on which the vehicle body is inclined when the side stand is in use.

5. The straddle vehicle according to claim 1, further comprising:
a further headlamp main body adjacent to the headlamp main body,
wherein the headlamp main bodies are arranged in a pair in the vehicle width direction, wherein each of the headlamp main bodies is configured so that an optical axis is adjustable by changing positions of at least two points among:
a first point and a second point located at different heights from each other; and
a third point located farther from a center of the vehicle width direction of the vehicle body than any of the first point and the second point, and
wherein a height of the third point is higher than a height of an intermediate position between the first point and the second point.

6. The straddle vehicle according to claim 5, wherein an airflow guiding hole is arranged between the pair of the headlamp main bodies.

7. The straddle vehicle according to claim 1, further comprising:
a radiator,
wherein a reservoir tank of the radiator is provided on one side in the vehicle width direction of the vehicle body and
wherein the driver circuit is located on a side opposite to the side on which the reservoir tank is located in the vehicle width direction.

8. The straddle vehicle according to claim 1, further comprising:
a canister located on one side of the vehicle body in the vehicle width direction,
wherein the driver circuit is located on a side opposite to the side on which the canister is located in the vehicle width direction.

9. The straddle vehicle according to claim 1, wherein the driver circuit driving the headlamp main body is disposed at a part of the first side cowl that is located lower than the front cowl.

10. The straddle vehicle according to claim 1, wherein the driver circuit driving the headlamp main body is located below the housing that accommodates the light emission member.

11. The straddle vehicle according to claim 1, further comprising:
a radiator cooling a drive source, the radiator including a radiator core,
wherein the driver circuit driving the headlamp main body is disposed outside of the radiator core in the vehicle width direction, the driver circuit driving the headlamp main body is disposed forward of the radiator, and wherein when the vehicle body is in a neutral position in which the vehicle body does not lean, a height of the driver circuit is the same as a height of the radiator.

12. The straddle vehicle according to claim 1, further comprising:
a radiator cooling a drive source, the radiator including a radiator core; and
a blocking member preventing air that has passed through the radiator from back-flowing forward is disposed between the driver circuit and the radiator,
wherein the driver circuit driving the headlamp main body is disposed forward of the radiator.

13. The straddle vehicle according to claim 1, further comprising:
a radiator cooling a drive source, the radiator including a radiator core; and
a side stand supporting the vehicle body in an inclined state in which the vehicle body is inclined to one side in the vehicle width direction when in use,
wherein relative to the radiator, the driver circuit is located on the side on which the vehicle body is inclined when the side stand is in use, and
wherein the driver circuit driving the headlamp main body is disposed outside of the radiator core in the vehicle width direction.

14. The straddle vehicle according to claim 1, further comprising:
a radiator cooling a drive source, the radiator including a radiator core;
a side stand supporting the vehicle body in an inclined state in which the vehicle body is inclined to one side in the vehicle width direction when in use; and
a canister located on one side of the vehicle body in the vehicle width direction,
wherein a reservoir tank of the radiator is provided on one side in the vehicle width direction of the vehicle body,
wherein the driver circuit is located on a side opposite to the side on which the canister is located in the vehicle width direction,
wherein the driver circuit is located on a side opposite to the side on which the reservoir tank is located in the vehicle width direction,
wherein relative to the radiator, the driver circuit is located on the side on which the vehicle body is inclined when the side stand is in use, and
wherein the driver circuit driving the headlamp main body is disposed outside of the radiator core in the vehicle width direction.

15. The straddle vehicle according to claim 1, further comprising:
a radiator cooling a drive source, the radiator including a radiator core,
wherein the driver circuit driving the headlamp main body is disposed outside of the radiator core in the vehicle width direction,
wherein a reservoir tank of the radiator is provided on one side in the vehicle width direction of the vehicle body, and wherein the driver circuit is located on a side opposite to the side on which the reservoir tank is located in the vehicle width direction.

16. The straddle vehicle according to claim 1, further comprising:
a radiator cooling a drive source, the radiator including a radiator core; and
a canister located on one side of the vehicle body in the vehicle width direction,
wherein the driver circuit is located on a side opposite to the side on which the canister is located in the vehicle width direction and
wherein the driver circuit driving the headlamp main body is disposed outside of the radiator core in the vehicle width direction.

17. The straddle vehicle according to claim 1, wherein the driver circuit is formed in a rectangular shape, the driver circuit being inclined and arranged so that one side of the rectangular shape follows an inclination of a front edge of the first side cowl.

18. A straddle vehicle, comprising:
a vehicle body;
a headlamp main body including a housing that accommodates a light emission member;
a driver circuit driving the headlamp main body; and
a cowl,
wherein the driver circuit driving the headlamp main body is disposed outside the housing in a vehicle width direction,
wherein the driver circuit is located below the housing,
wherein the driver circuit is spaced from the housing, and
wherein the cowl includes a first side cowl disposed at a first side of the vehicle and a second side cowl disposed at a second side of the vehicle and wherein the driver circuit is in the first side cowl.

19. A straddle vehicle, comprising:
a vehicle body;
a headlamp main body including a housing that accommodates a light emission member;
a driver circuit driving the headlamp main body, the driver circuit being disposed outside the housing in a vehicle width direction, the driver circuit being located below the housing, the driver circuit being spaced from the housing;
a cowl;
a radiator cooling a drive source, the radiator including a radiator core; and
a side stand supporting the vehicle body in an inclined state in which the vehicle body is inclined to one side in the vehicle width direction when in use,
wherein relative to the radiator, the driver circuit is located on the side on which the vehicle body is inclined when the side stand is in use, and
wherein the driver circuit driving the headlamp main body is disposed outside of the radiator core in the vehicle width direction.

* * * * *